Feb. 10, 1970  LE ROY M. ANDERSON ET AL  3,494,681
BEARING SEAL
Filed Feb. 5, 1968
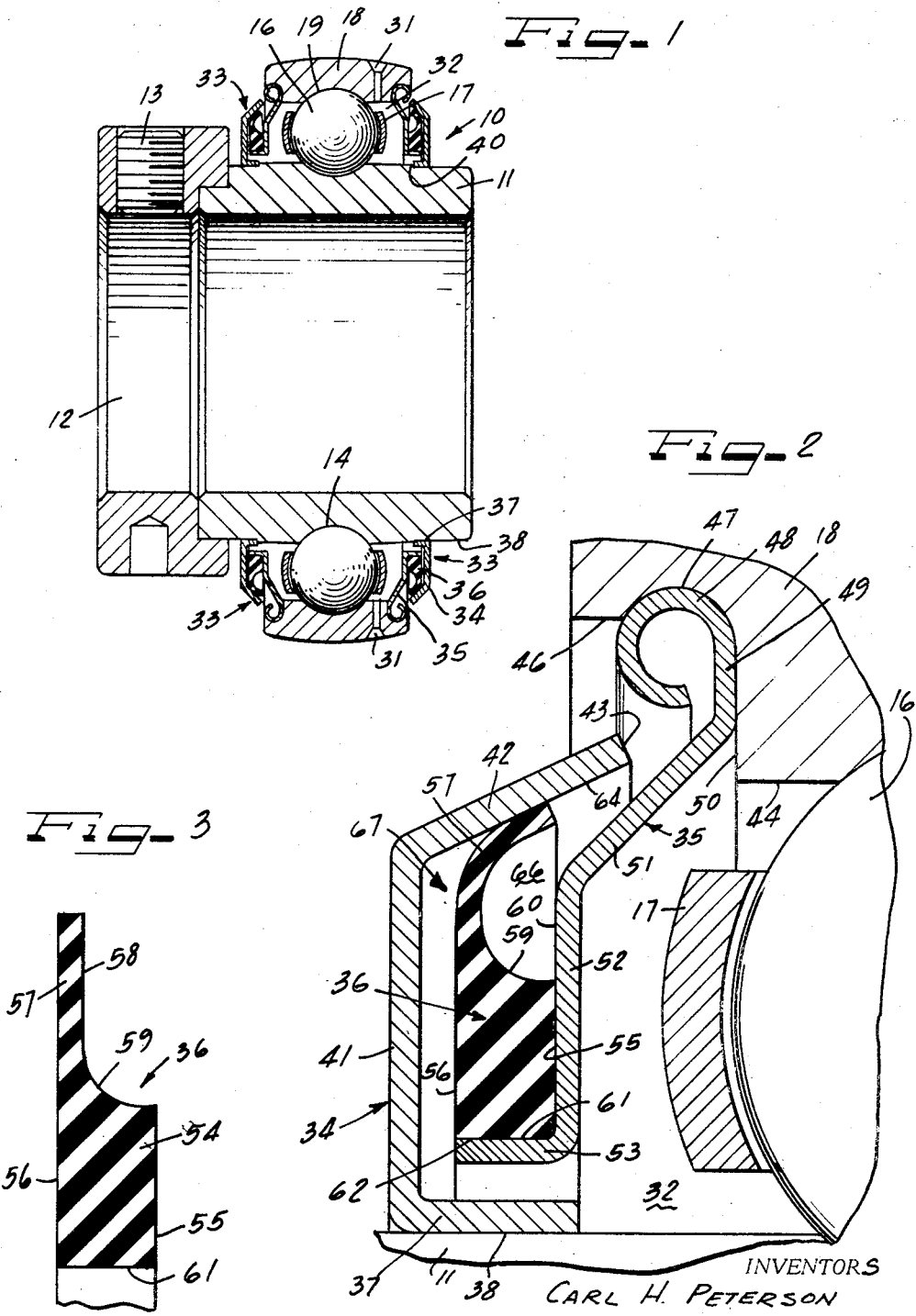
INVENTORS
CARL H. PETERSON
LEROY M. ANDERSON
LAWRENCE G. ANDERSON
ATTORNEYS 3,494,681
BEARING SEAL
Le Roy M. Anderson, Jamestown, Lawrence G. Anderson, Greenhurst, and Carl H. Peterson, Lakewood, N.Y., assignors to TRW Inc., Cleveland, Ohio, a corporation of Ohio
Filed Feb. 5, 1968, Ser. No. 702,944
Int. Cl. F16c 33/78; F16j 15/34, 15/54
U.S. Cl. 308—187.1                                                1 Claim

ABSTRACT OF THE DISCLOSURE

A seal assembly for regreasable anti-friction bearing units which has an outer flinger ring element press-fitted onto the inner race ring of the bearing axially beyond the anti-friction elements and a cooperating second retainer ring press-fitted onto the outer ring of the bearing axially inward of the flinger and contoured with respect to the flinger to create thereby a labyrinth seal. The retainer ring carries an elastomeric wiping element which has a main body ring portion carried by the retainer and a free flexible lip extending therefrom into contact with the inside face of the flinger in a deflected condition to provide a lip seal which has its sealing pressure increased when subjected to pressure externally of the bearing assembly, but which will deflect to open an escape passage when subjected to excessive internal pressures such as during regreasing the bearing.

BACKGROUND OF THE INVENTION

Field of the invention

This invention relates to bearing assemblies and more particularly to grease and dirt seals for ball and roller bearing units.

Prior art

The use of labyrinth seals employing flingers in bearing assemblies is known in the art. It is also known in the art to provide elastomeric inserts between the flinger and the axially inner retainer member of the labyrinth seal. (See for example U.S. Patent No. 2,705,161, issued to J. E. Shafer.) Such prior art seals have disadvantages in that the resilient elements do not yield to allow bleeding of excessive internal pressure and, in fact, internal pressure increases the frictional engagement of the seal, thereby decreasing the anti-friction abilities of the bearing assembly. A further disadvantage inherent in such prior art devices is the inability of the elastomeric member to continue to provide an effective seal after a break-in period in which the elastomeric element becomes worn.

Summary

These deficiencies are overcome by our invention which provides a flinger element press-fitted onto the inner race ring of a ball bearing unit which has a portion extending radially outward from the inner ring and a second portion integral with the first portion and angled therefrom extending radially outward from the inner ring and axially inward towards the ball cage, but radially beyond the ball cage. A second metallic ring member or retainer adapted to coact with the flinger is press-fitted into the outer ring of the bearing axially inward from the end of the flinger element. The second member has a portion extending radially inward and axially outward from the inner ring which projects radially inward and axially outward beyond the outer end of the flinger. A second portion integral with this portion extends from it in an angled relation and is parallel to the radial portion of the finger element. The second portion ends in an axial lip which extends axially outward towards the flinger element. An elastomeric resilient wiping element is attached to the cooperating member axially between the flinger and the radial portion of the cooperating seal member. The elastomeric wiping element has a free lip extending radially outward therefrom which engages the angled portion of the flinger on its axially inner face. The lip is arranged so that external pressure will act to press it more tightly against the flinger thus providing a better seal. On the other hand, internal pressures such as might occur during regreasing of the bearing assembly will cause the lip to break contact with the flinger, thereby venting the interior of the bearing assembly to allow bleeding of grease. The lip portion in its free state normally extends radially outward from the main body portion of the wiping element, but in the assembled state is arcuately deformed against the flinger. Due to the resilient nature of the lip, as wear of the lip is encountered during operation of the assembly, the lip will continue to attempt to regain its undeformed free state position thereby continuing the effectiveness of the lip as a sealing element.

It is therefore an object of this invention to provide an inexpensive improved seal for bearing units.

It is a further object of this invention to provide a bearing seal having the properties of both a labyrinth gap seal and a direct contact lip seal.

It is a further and more specific object of this invention to provide a seal for bearing assemblies which has an outer flinger element having its interior face wiped by the lip of a resilient wiping member carried by an inner retainer member which cooperates with the outer member to provide a labyrinth, the lip being deflectable under internal pressures to allow bleeding of grease from the inside of the bearing assembly.

BRIEF DESCRIPTION OF THE DRAWINGS

FIGURE 1 is a sectional view of a regreasable ball bearing unit equipped with seals of this invention.

FIGURE 2 is an enlarged fragmentary sectional view of the seal assembly of FIGURE 1.

FIGURE 3 is an enlarged fragmentary sectional view of the wiping element of the seal in its free state.

DESCRIPTION OF THE PREFERRED EMBODIMENT

FIGURE 1 illustrates a bearing unit 10 which has an inner race ring or sleeve 11 adapted to encircle a shaft. The sleeve 11 receives at one end thereof a collar 12 which has set screws 13 therethrough. The collar 12 cam locks with the sleeve 11. Tightening the set screws 13 onto a shaft received through the sleeve 11 and the collar 12 locks the shaft to the sleeve 11. The sleeve 11 has an outer circumferential groove 15 which provides the inner race way for a ring of balls 16 which are held in spaced circumferential relation by a bearing cage 17. An outer race ring 18 surrounds the sleeve 11 and has an inner circumferential groove 19 which forms the outer race way for the balls 16. The outer race ring 18 is adapted to be fitted into a housing (not shown) surrounding the shaft. Regreasing bores 31 are provided through the member 18 to allow the bearing unit assembly to be greased. The bores 31 open in a chamber 32 between the rings 11 and 18 surrounding the balls 16.

In order to retain grease within the chamber 32 and to prevent entrance of dirt, seal assemblies 33 are provided on each side of the balls 16. Each seal assembly 33 consists of three parts, a flinger element 34, an inner retainer member 35, and a wiping element 36.

The flinger element 34 is a ring of shaped metal which has an axially extending flange 37 around its inner periphery. The flange 37 is adapted to be press-fit onto the exterior surface 38 of the sleeve 11. As is shown in FIGURE 1, the sleeve 11 may have shoulders 40 for locating the flinger 34. However, as is shown in FIGURE 2, the flange 37 of the flinger 34 may simply be press-fit to the desired axial location on the exterior surface 38 of the sleeve 11. Extending outwardly from the flange portion 37 is a radially directed portion 41 which terminates in an angled portion 42. The angled portion 42 extends radially outwardly and axially inwardly towards the ball cage 17. The radial width of the flinger 34 is such that the end 43 of the angled portion 42 extends radially outwardly beyond the major portion of the diameters of the ball bearings 16. As is illustrated in FIGURE 2 in the preferred embodiment the end 43 of the angled portion 42 extends radially outwardly beyond the inner periphery 44 of the outer race way member 18.

The outer race way member 18 has circumferential notches 46 therein at the axial ends thereof around the inner periphery. The notches 46 have recessed radial grooves 47 therein which receive and seat an arcuately curved outer diameter end 48 of the inner seal member or retainer 35. The arcuately curved end 48 has a radial portion 49 extending therefrom which abuts a radial wall or shoulder 50 of the notch 46. The outer periphery of the retainer ring 35 is thus springy and adapted to be snapped into the groove 47 to be fixedly carried by the outer race ring 18.

The portion 49 of the retainer ring 35 is integral with a portion 51 which projects radially inward and axially outward therefrom to a position axially inward and radially inward from the end 43 of the flinger 34. A radial portion 52 integral with the portion 51 extends therefrom in spaced parallel relation to the portion 41 of the flinger 34. The portion 52 extends radially inwardly beyond the mid-point of the ball bearings 16 and terminates in an integral axial lip portion 53 which extends axially outwards towards the portion 41 of the flinger 34 and terminates in spaced relationship therewith. The combination of the flinger 34 and the ring 35 provides a labyrinth seal sealing the chamber 32 around the ball assembly.

The elastomeric wiping element 36 is seated in the space between the flinger 34 and the retainer ring 35. As best shown in FIGURE 3, the wiping element 36 has a rectangular cross section main body ring 54 which has two radial faces 55 and 56. A reduced thickness lip portion 57 projects from the main body 54 in a radially outward direction at the side 56. The radial wall 56 defines one side of the lip 57, the other side being defined by a radial wall 58 which terminates on its radially inner side in an arcuately curved wall 59 which in turn terminates at the opposite radial wall 55.

The wiping element 36 is received in the space 59 between the parallel portions 41 and 52 of the flinger 34 and the inner ring 35. The radial wall 55 abuts the axial outer face 60 of the portion 52 of the inner ring 35 and the inner circumferential periphery 61 of the wiping element 36 engages the radial outer face 62 of the flange 53 of the inner retainer ring 35. The wiping element 36 may be bonded to the surfaces 60 and 62 or may be otherwise adhered thereto.

The radial width of the wiping element 36 is such that when it is positioned on the inner retainer ring 35 the lip portion 57 projects radially outwardly into contact with the inner face 64 of the portion 42 of the flinger. The contact is made in such a manner that the wiping lip 57 is arcuately bent axially inward as is illustrated in FIGURE 2. In this manner, the radially outermost portion of the radial face 56 of the wiping element rides against the face 64 of the flinger in a wiping contact therewith. The arcuate bending of the lip portion 57 assures the maintenance of a seal between the lip portion and the portion 42 of the flinger.

Since the lip portion 57 is bent axially inwardly from its free state position, external pressure from outside of the bearing assembly will act in the space 66 between the flinger and retainer to increase the contact pressure between the lip 57 and the portion 42 of the flinger. However, excessive internal pressure will act in the space 67 axially outward from the lip portion to cause the lip portion to increase its arcuate bending to a point where the excess internal pressure is released or bled past the lip 57 and the portion 42. In this manner, excessive internal grease pressure is released by the seal where excessive external pressure is sealed from the bearing assembly.

The seal in addition to acting as a pressure relief seal, also forms an effective dirt and dust seal. A further advantage inherent in this seal is that as use of the bearing assembly creates wear on the radial face 56 of the lip portion 57, the arcuate bending of the lip will continue its resilient attempt to unbend into its free state condition as shown in FIGURE 3. This resilient unbending will act to keep a sealing contact between the lip and the portion 42, thereby giving the seal the advantage of being able to accommodate wear.

It can therefore be seen from the above that our invention provides for an inexpensive improved seal for ball bearing assemblies which combines the features of a labyrinth seal with the features of a direct contact lip seal. Although the invention has been described in connection with a ball bearing assembly, it is to be understood that it can be used with a roller bearing or other type bearing assembly.

Although we have herein set forth our invention with respect to certain specific principles and details thereof, it will be understood that these may be varied without departing from the spirit and scope of the invention as set forth in the hereunto appended claims.

We claim as our invention:

1. A bearing assembly which comprises: inner and outer bearing race rings, a plurality of anti-friction bearing elements between said race rings, said rings extending axially beyond the said bearing elements, two seal assemblies positioned axially beyond the bearing elements sealing the space between the rings, each seal assembly having a flinger ring carried by the inner race ring and abutting an enlarged diameter portion thereon and extending radially outwardly therefrom, a cooperating retainer ring spaced axially inward of said flinger ring carried by the outer race ring and extending radially inward therefrom, said flinger ring and cooperating retainer ring contoured to create a labyrinth seal between the interior and exterior of the seal assembly, an elastomeric wiping element carried by said cooperating retainer ring, said element having an axially thick body portion secured to said retainer ring and an elongated integral lip portion extending radially outwardly from the body portion at the axially outer edge thereof in spaced relation from the retainer ring, the radial outer end portion of said lip being deformed radially inward by abutting against a portion of said flinger, a portion of the axially outer face of said lip having a greater length than the thickness of the said lip riding on said flinger in resilient sealing engagement therewith whereby the seal contact area is a greater area than the cross-sectional area of the lip, and the lip-to-flinger ring engagement responsive to a pressure differential between the interior and exterior of the bearing assembly allowing venting of excessive interior pressures while sealing against exterior environments.

(References on following page)

References Cited

UNITED STATES PATENTS

| | | | |
|---|---|---|---|
| 2,639,954 | 5/1953 | Potter | 308—187.2 |
| 2,686,088 | 8/1954 | Nelson | 308—187.2 X |
| 2,888,304 | 5/1959 | Kooistra | 308—187.2 |
| 2,990,201 | 6/1961 | Stepens | 308—187.2 |
| 3,144,280 | 8/1964 | Sorenson | 277—65 X |
| 3,245,735 | 4/1966 | Sikora | 308—187.1 |
| 3,306,223 | 2/1967 | Liebig | 227—65 X |
| 3,363,911 | 1/1968 | McKinven | 277—65 |

FOREIGN PATENTS

| | | |
|---|---|---|
| 250,392 | 3/1964 | Australia. |
| 613,996 | 2/1956 | Canada. |

MARTIN P. SCHWADRON, Primary Examiner

L. L. JOHNSON, Assistant Examiner

U.S. Cl. X.R.

277—65, 82; 308—187.2

UNITED STATES PATENT OFFICE
CERTIFICATE OF CORRECTION

Patent No. 3,494,681            Dated February 10, 1970

Inventor(s) Leroy M. Anderson et al

It is certified that error appears in the above-identified patent and that said Letters Patent are hereby corrected as shown below:

In the specification:

Col. 1, line 14    "finger" should be --flinger--

Col. 2, line 4    "finger" should be --flinger--

Col. 2, line 58    "15" should be --14--

SIGNED AND SEALED
SEP 1 - 1970

(SEAL)
Attest:

Edward M. Fletcher, Jr.
Attesting Officer

WILLIAM E. SCHUYLER, JR.
Commissioner of Patents